2,701,231

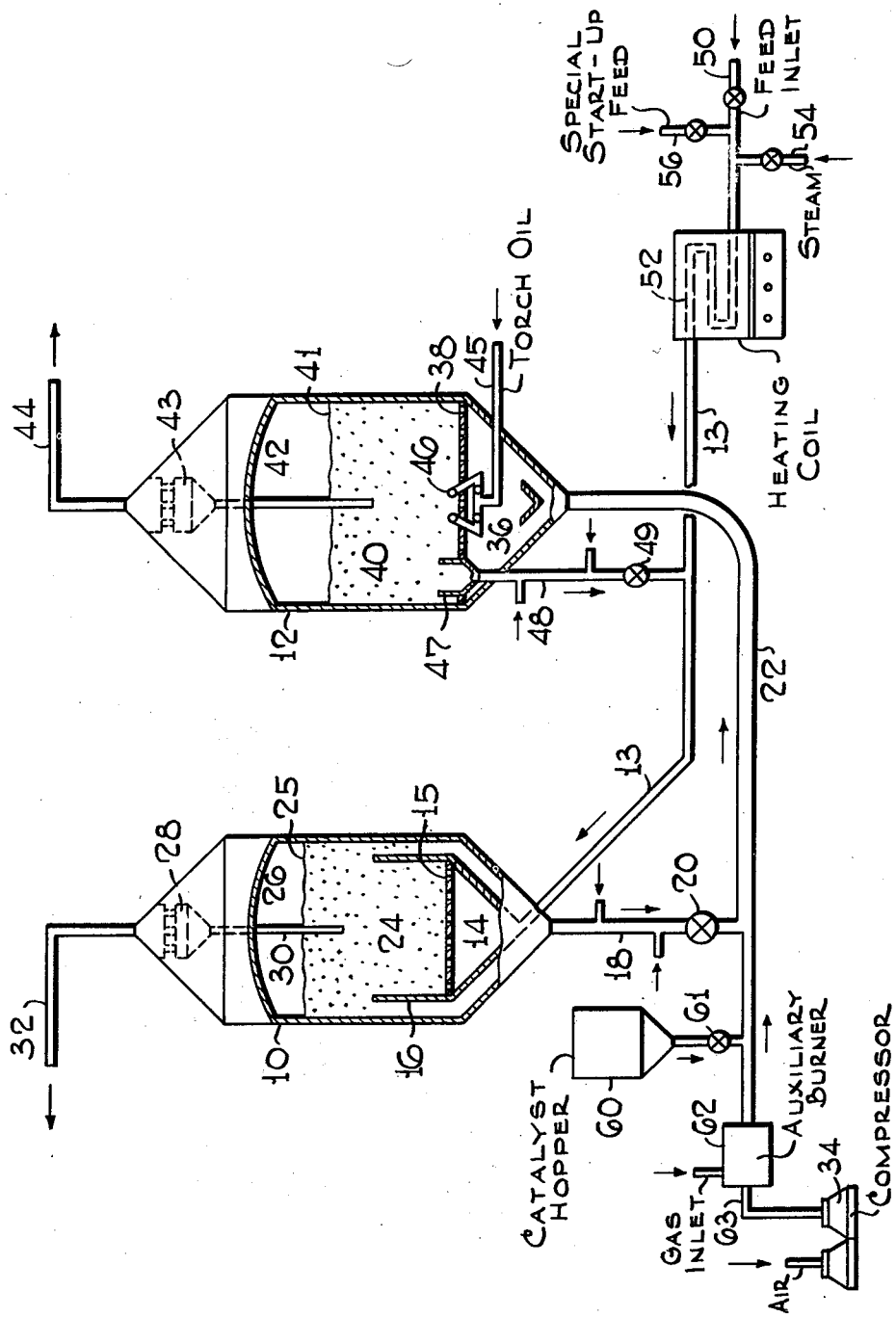

CATALYTIC HYDROCARBON CONVERSION STARTING UP PROCEDURE

Charles E. Starr, Jr., Baton Rouge, La., assignor to Standard Oil Development Company, a corporation of Delaware Application February 7, 1951, Serial No. 209,819

1 Claim. (Cl. 196—52)

This invention relates to the conversion of hydrocarbon liquids and more particularly to a starting up procedure for catalytic cracking plants using the fluidized solids technique.

In the catalytic conversion or cracking of hydrocarbon liquids by the fluidized solids technique, high temperatures are necessary in the reaction zone where splitting of the hydrocarbon molecules is effected and in the regeneration zone where coke or carbonaceous deposits are burned from the spent catalyst particles. In order to start up such a process it is necessary to bring the entire unit from atmospheric temperature to the high operating temperatures slowly and uniformly so as to avoid distortion and breakage of parts of the reactor system due to uneven expansion.

The starting up procedure requires from part of a day to about two days time to prepare the reactor system for the hydrocarbon conversion process. Since steam is used as fluidizing medium at various points in the system and also as the stripping medium for removing adsorbed or entrained gaseous or vaporizable material from the finely divided or powdered catalyst during removal from the conversion reactor it is necessary to have the entire unit or system heated up to a temperature above the condensation point of water before introducing steam to avoid wetting and agglomeration of the powdered catalyst with resultant plugging of the lines. Accordingly it has been proposed to utilize an auxiliary burner for preheating the unit. Hot combustion gases from this auxiliary burner at a temperature of about 1000° F. are passed through the reactor and the regenerator and associated parts to heat the unit to a temperature above about 250 or 300° F. The powdered catalyst is added to the combustion gases going to the regenerator and a bed of catalyst is gradually built up in the regenerator. The heating is continued until the temperature is about 600° F. Hot catalyst is then passed through the standpipe from the regenerator into the conversion reaction zone where a small level of fluidized catalyst is maintained. Aeration gas is introduced whenever and wherever needed to maintain the catalyst particles in fluidized condition.

Oil is then added to the regeneration zone for combustion therein to heat the catalyst to a temperature of 700–950° F. Additional catalyst is introduced into the system to bring the level of the catalyst in the regenerator and reactor to the desired point. When the temperature of the catalyst in the system is about 800–1000° F., liquid hydrocarbon feed, preferably preheated to temperatures of about 100–500° F. is introduced into the reactor and the conversion operation is started.

Difficulties have been encountered in starting up fluid catalyst cracking units which are charged with feed stocks that are relatively high in aromatics, particularly multi-ring aromatics. The principal difficulty appears to be the inability to burn off the carbon deposited upon the cracking catalyst by such feed stocks. When such hard-to-burn carbon is allowed to accumulate on the catalyst, subsequent lay down of carbon is higher because the catalytic effects are masked by the coating of carbon and the system is prevented from operating at its designed or rated capacity because of the inability to burn off the carbonaceous deposits which reduce the activity of the catalyst.

It is the object of this invention to provide the art with a method of starting up a reactor system for catalytically cracking feed stocks high in aromatics, and particularly fused ring aromatics in accordance with the fluidized solids technique.

It is also the object of this invention to provide the art with a method of starting up reactor systems for catalytically cracking highly aromatic feed stocks in accordance with the fluidized solids technique which will avoid or overcome the deleterious effects of carbonaceous deposits from fused ring aromatics in the feed stock.

These and other objects will appear more clearly from the detailed specification and claim which follow.

It has now been found that the hard-to-burn carbon deposited on cracking catalysts during the cracking of feed stocks high in aromatics, and particularly, high in content of fused ring aromatics, cannot be burned off in the regeneration unit unless temperatures of 1100° F. or higher are obtained therein and in accordance with this invention such temperatures are obtained by the use of a special start-up feed stock during the initial stages of operation so that the type of carbon laid down in the cracking section may be readily burned off in the regenerator at temperatures under 1100° F. After regeneration temperatures of 1100° F. or higher are attained, the feed stocks high in aromatics may be fed to the cracking reactor and special feed may be discontinued. The feed stocks requiring the present start-up procedure are those containing at least 40 volume per cent aromatics of which at least about 10 volume per cent are fused ring aromatics of 3 or more rings per molecule.

The accompanying drawing illustrates diagrammatically the essential parts of one type of reactor system in which the start-up procedure in accordance with the present invention may be carried out.

Referring to the drawing, 10 is a reactor vessel of the so-called dense bed, bottom draw-off type and 12 is a regenerator of the same type. The reactor 10 is provided with a feed inlet line 13 which discharges into inlet chamber 14. A perforated plate or distribution grid 15 is arranged across the top of the inlet chamber in order to distribute the incoming charge evenly across the entire cross-section of the reactor. A cylindrical sleeve 16 surrounds the distribution grid 15 and extends a substantial distance above the grid in order to form an annular passageway between its outer wall and the inner wall of the reactor vessel for the withdrawal and stripping of spent catalyst preparatory to passage through spent catalyst standpipe 18, control valve 20 into line 22 to regenerator 12. The supply of catalyst and the velocity of the reactant vapors to the reactor are so correlated as to form a dense, fluidized, liquid simulating bed 24 having a definite level 25 in the lower portion of the reactor vessel 10. Reactant and reaction product vapors leaving the dense bed entrain a small percentage of catalyst particles to form a dilute or disperse phase 26 in the upper portion of the reactor vessel. A cyclone separator 28 or the like is arranged at the top of the reactor for separating entrained catalyst particles from the outgoing vapors, which catalyst particles are returned to the dense bed via dip pipe 30. Reaction product vapors are withdrawn from the reactor through line 32 and are passed to suitable fractionation and product recovery equipment.

Spent catalyst discharged from standpipe 18 into conduit 22 is conveyed by a stream of air from compressor 34 into inlet chamber 36 in the bottom of regenerator 12. A perforated plate or distribution grid 38 is provided for distributing the incoming spent catalyst and air uniformly over the entire cross section of the regenerator vessel. The supply of catalyst and air to the regenerator are so correlated as to form a dense, fluidized, liquid-simulating bed 40 having a definite level 41 in the lower portion of the regenerator. Catalyst is entrained in the regeneration gases forming a dilute or disperse phase 42 in the upper part of the regenerator and a cyclone separator 43 is provided for the removal of the major proportion of the entrained catalyst particles from the regeneration gases prior to discharge of the latter through outlet conduit 44 connected to the top of regenerator 12. A line 45 is provided for the supply of torch oil or other combustible oil to a burner 46 in the bottom of the regenerator for heating or assisting in the heating of the regenerator. A well 47 extending above distribution grid 38 is provided for withdrawing regenerated catalyst directly from the dense bed 40. The well 47 discharges regenerated catalyst into standpipe 48 and through control valve 49 into inlet line 13.

Feed stock is introduced into the reactor system through feed inlet 50 and the feed is preheated in heating coil 52 to vaporize or at least partially vaporize the feed prior to introduction into inlet line 13 for admixture with freshly regenerated catalyst and passage into the reactor vessel 10. A steam inlet line 54 and a special start-up feed inlet line 56 are provided for starting up the reactor system in the manner described below.

A catalyst hopper 60 is provided for the introduction of catalyst charge or make up catalyst through control valve 61 into inlet line 22 to the regenerator. An auxiliary burner 62 is provided on the air inlet line 63 for starting up the reactor system.

The following initial steps are essentially typical of what is now conventional technique for starting up a fluidized solids catalytic cracking system. With the system empty, air is pumped by compressor 34 through line 63 into auxiliary burner 62 where it is mixed and burned with a suitable fuel gas. Hot combustion gases are passed from the auxiliary burner through the reactor and the regenerator. This is preferably carried out by keeping valve 20 closed and closing or partially closing line 44 so that the hot combustion gases pass into regenerator 12 and thence via well 47, standpipe 48 and inlet conduit 13 into the reactor vessel from which it may be discharged to the atmosphere via a suitable by-pass line (not shown) connected to outlet line 32. When the temperature throughout the system reaches about 250–300° F., catalyst is withdrawn from hopper 60 and introduced into regenerator. Control valve 49 is closed to retain the catalyst in the regenerator while valve 20 and a valve in outlet line 44 are opened sufficiently to permit part of the hot combustion gases to pass through the reactor via standpipe 18 and the remainder to pass through the regenerator. This is continued until a temperature of about 600° F. is reached and the desired level of catalyst is obtained in the regenerator. Valve 49 controlling the flow of catalyst through standpipe 48 and the valve controlling the introduction of steam through line 54 are opened to permit the introduction of catalyst into the reactor 10. The steam supplied through line 54 serves to convey catalyst into the reactor and also to purge or remove combustion gases from the reactor. Steam is introduced into the annular stripping section of the reactor and also into the standpipe in order to fluidize catalyst particles and free the entire reactor of combustion gases. Accumulation of catalyst in the standpipe 18 particularly when coupled with a further opening of the outlet line 44 from the regenerator serves to prevent circulation of combustion gases through the reactor.

In order further to heat up the system, additional air is introduced into the regenerator and at the same time torch oil is introduced through line 45 to burner 46 within the dense bed 40 in the regenerator. Further amounts of catalyst are added to the system until sufficient catalyst to give the desired bed levels in the reactor and regenerator is present. When the catalyst in the regenerator is at a temperature of about 650–950° F. the firing of the auxiliary burner 62 is reduced and further heating obtained by burning torch oil in burner 46. When the catalyst in the regenerator is at a temperature of about 950°–1000° F., the auxiliary burner may be shut off completely and the temperature in the regenerator may be maintained or increased by control of the flow of torch oil to burner 46. At this point the system is ready for the introduction of oil to the reactor 10. The foregoing steps are essentially typical of what is now conventional technique for starting up a fluidized solids catalytic cracking system. A more detailed disclosure of this technique may be found in Martin U. S. Patent No. 2,420,049 issued May 6, 1947, and for the starting up of an upflow reactor system in Tyson U. S. Patent No. 2,391,366 issued December 18, 1945.

In accordance with the present invention a special start-up feed is first fed to the reactor unit. The special start-up feed should be a paraffinic or paraffinic-naphthenic gas oil boiling under 1000° F. The content of aromatics of the special start-up feed stock should be low, i. e., below 40 volume percent and preferably below 20 volume percent; and in every case the aromatics present in the start-up feed should contain less than 2 volume percent of fused ring aromatics containing more than 2 fused rings per molecule. The total aromatics content so specified is the value obtained by adsorption over standard analytical grade silica gel. The presence of fused ring aromatics of more than 2 rings is defined by the measurement of the absorption coefficient of ultraviolet light at 260 millimicrons, employing for the measurement the total aromatics fraction separated by the standard silica gel adsorption procedure. The special start up feed is introduced through line 56 and combined with steam, if desired, is passed through heating coil 52 in order to raise its temperature to about 400–500° F. whereupon the preheated feed is combined with hot, 950° F. catalyst particles and is conducted into reactor 10. Carbonaceous deposits are formed on the catalyst particles and spent catalyst particles are withdrawn from the dense bed 24 in reactor 10, stripped of adsorbed and entrained vaporizable materials, discharged via standpipe 18 into a stream of air which conveys the spent catalyst into the regenerator 12. In view of the nature of the special start-up feed stock, the carbonaceous deposits are easily burned off the catalyst. The heat formed in the regeneration of the catalyst particles coupled with the heat generated by the combustion of torch oil gradually increases the temperature of the catalyst particles in the regenerator. When the temperature of the catalyst particles in the regenerator reaches 1100° F., the special start-up feed stock can be discontinued and the regular feed stock high in aromatics, i. e., containing at least 40 volume percent of aromatics of which at least 10 volume percent are fused ring aromatics of 3 or more rings per molecult, can then be introduced through line 50. Normally this change over is effected by gradually decreasing the supply of special start-up feed and increasing the supply of highly aromatic feed stock. At these temperatures the refractory carbonaceous deposits formed on the catalyst particles in the reaction zone are sufficiently burned off to maintain the activity level of the equilibrium catalyst sufficiently high to permit continuance of the cracking at the desired or optimum feed rate for the system. The supply of steam through line 54 may be stopped or continued as desired in order to maintain the desired conditions in the cracking reactor.

An experiment was conducted to determine the relative burning rates of carbon deposits on silica-alumina cracking catalyst as obtained from normal cracking operations with the start-up feed stock and with two typical highly aromatic feed stocks.

| | Burning Rate #C/Hr./Ton Catalyst | Percent Total Aromatics | Percent Fused Rings Higher than 2 |
|---|---|---|---|
| Special Start-up Feed | 60 | 39 | 0 |
| Typical Gas Oil Feed A | 40 | 43 | 12 |
| Typical Cycle Oil Feed B | 12 | 59 | 65 |

In this experiment normal regeneration conditions were employed at a temperature level of 1100° F. At lower temperatures such as are encountered in starting up operations, the relative burning rates are considerably lower than the values shown and for many normal feeds are sufficiently low that accumulation of carbon deposits on catalyst is excessively high.

Although the foregoing description contains a limited number of embodiments of the present invention, it will be understood that numerous variations are possible without departing from the scope of the following claim.

What is claimed is:

In a starting up procedure for catalytic cracking units for the catalytic cracking of high boiling hydrocarbon feed stocks containing at least 40% aromatics of which at least 10% by volume are fused ring aromatics of 3 or more rings per molecule into lower boiling hydrocarbon motor fuels by the fluid solids technique, the improvement which comprises heating the reactor system to a temperature of about 850°–950° F. in the reactor and about 975°–1025° F. in the regenerator, then charging to said reactor a special startup paraffinic-naphthenic hydrocarbon feed stock boiling below about 1000° F. and containing less than 20% by volume of aromatic hydrocarbons and specifically containing aromatic hydrocarbons that have less than 2 volume per cent of fused ring aromatic hydrocarbons containing more than 2 fused rings per molecule, effecting the cracking of said startup hydrocarbon feed stock to lower boiling hydrocarbons and depositing on the catalyst particles a carbonaceous deposit having a high burning rate, regenerating the catalyst particles by burning off said carbonaceous deposit in said regenerator, increasing the temperature in said regenerator to at least about 1100° F. by burning extraneous hydrocarbon oil in said regenerator while regenerating the catalyst, and then discontinuing the supply of special startup hydrocarbon feed stock and commencing the supply to said reactor of regular hydrocarbon feedstock containing at least 40 volume per cent of aromatic hydrocarbons at least 10 volume per cent of which are fused ring aromatics of 3 or more rings per molecule.

References Cited in the file of this patent

UNITED STATES PATENTS

| | | |
|---|---|---|
| 2,340,960 | Hemminger | Feb. 8, 1944 |
| 2,391,367 | Hodgeson | Dec. 18, 1945 |
| 2,420,049 | Martin | May 6, 1947 |
| 2,421,616 | Hemminger et al. | June 3, 1947 |